(12) United States Patent
Suzuki

(10) Patent No.: US 9,090,433 B2
(45) Date of Patent: Jul. 28, 2015

(54) ELEVATOR SYSTEM AND ELEVATOR GROUP CONTROL SYSTEM THAT INCLUDES A STANDBY OPERATION

(75) Inventor: Naohiko Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

(21) Appl. No.: 13/824,054

(22) PCT Filed: Nov. 24, 2010

(86) PCT No.: PCT/JP2010/070917
§ 371 (c)(1),
(2), (4) Date: Mar. 15, 2013

(87) PCT Pub. No.: WO2012/070124
PCT Pub. Date: May 31, 2012

(65) Prior Publication Data
US 2013/0186713 A1    Jul. 25, 2013

(51) Int. Cl.
*B66B 1/18* (2006.01)
*B66B 1/34* (2006.01)
*B66B 1/24* (2006.01)

(52) U.S. Cl.
CPC ............. *B66B 1/3407* (2013.01); *B66B 1/2408* (2013.01); *B66B 2201/102* (2013.01);
(Continued)

(58) Field of Classification Search
CPC .................. B66B 2201/103; B66B 2201/214; B66B 2201/22; B66B 2201/24; B66B 2201/241; B66B 2201/242; B66B 1/3407; B66B 1/2408; B66B 2201/102; B66B 2201/211; B66B 2201/216; B66B 2201/232; B66B 2201/243; Y02B 50/122
USPC ........................... 187/247, 380–388, 391, 393
See application file for complete search history.

(56) References Cited

U.S. PATENT DOCUMENTS 3,895,692 A * 7/1975 Yeasting ...................... 187/382
7,328,775 B2 * 2/2008 Zaharia et al. ............... 187/396
(Continued)

FOREIGN PATENT DOCUMENTS

| JP | 54-124461 | 9/1979 |
| JP | 60 128175 | 7/1985 |

(Continued)

OTHER PUBLICATIONS

Combined Office Action and Search Report issued Mar. 5, 2014 in Chinese Patent Application No. 201080070116.2 (with partial English translation).

(Continued)

*Primary Examiner* — Anthony Salata
(74) *Attorney, Agent, or Firm* — Oblon, McClelland, Maier & Neustadt, L.L.P.

(57) ABSTRACT

An elevator system is provided with a remote hall call registering device by use of which an elevator passenger performs a hall call registration in a position at a prescribed distance from a hall. A moving time comparison device compares the predicted moving time Te of the elevator car with the predicted walking time Tw in the case where the floor on which a remote hall call registering device is installed is set as a parking floor. A standby operation go/no go determination device makes a determination as to whether or not to perform a standby operation based on the result of the comparison of the moving time comparison device, and carries out a standby operation after responses to all calls have been finished only in the case where the standby operation go/no go determination device made a determination to the effect that a standby operation should be performed.

8 Claims, 9 Drawing Sheets

(52) U.S. Cl.
CPC ..... *B66B2201/103* (2013.01); *B66B 2201/211* (2013.01); *B66B 2201/216* (2013.01); *B66B 2201/232* (2013.01); *B66B 2201/243* (2013.01); *Y02B 50/122* (2013.01)

(56) References Cited

U.S. PATENT DOCUMENTS

| | | | |
|---|---|---|---|
| 7,353,915 B2 * | 4/2008 | Zaharia et al. | 187/388 |
| 7,581,622 B2 * | 9/2009 | Amano | 187/384 |
| 7,650,966 B2 * | 1/2010 | Sansevero et al. | 187/249 |
| 7,849,974 B2 * | 12/2010 | Stanley et al. | 187/387 |
| 8,061,485 B2 * | 11/2011 | Finschi | 187/384 |
| 8,813,917 B2 * | 8/2014 | Salmikuukka et al. | 187/384 |
| 8,910,752 B2 * | 12/2014 | Furutani | 187/384 |
| 2009/0120727 A1 | 5/2009 | Hamaji et al. | |
| 2012/0090922 A1 * | 4/2012 | Elomaa et al. | 187/247 |
| 2012/0168261 A1 * | 7/2012 | Takeshima et al. | 187/385 |
| 2013/0068568 A1 * | 3/2013 | Nonami | 187/381 |

FOREIGN PATENT DOCUMENTS

| | | |
|---|---|---|
| JP | 61 41822 | 9/1986 |
| JP | 1 203185 | 8/1989 |
| JP | 6 127845 | 5/1994 |
| JP | 2005 324953 | 11/2005 |
| JP | 2006 306557 | 11/2006 |
| JP | 2008 254850 | 10/2008 |
| KR | 10-1992-0002455 A | 2/1992 |
| KR | 10-2007-0088519 A | 8/2007 |
| WO | 2007 052336 | 5/2007 |

OTHER PUBLICATIONS

Office Action issued Feb. 18, 2014 in Japanese Patent Application No. 2012-545566 with partial English language translation.
International Search Report Issued Mar. 1, 2011 in PCT/JP10/70917 Filed Nov. 24, 2010.
Korean Office Action issued Jul. 1, 2014 in Patent Application No. 10-2013-7014170 with English Translation.

* cited by examiner

Fig. 3

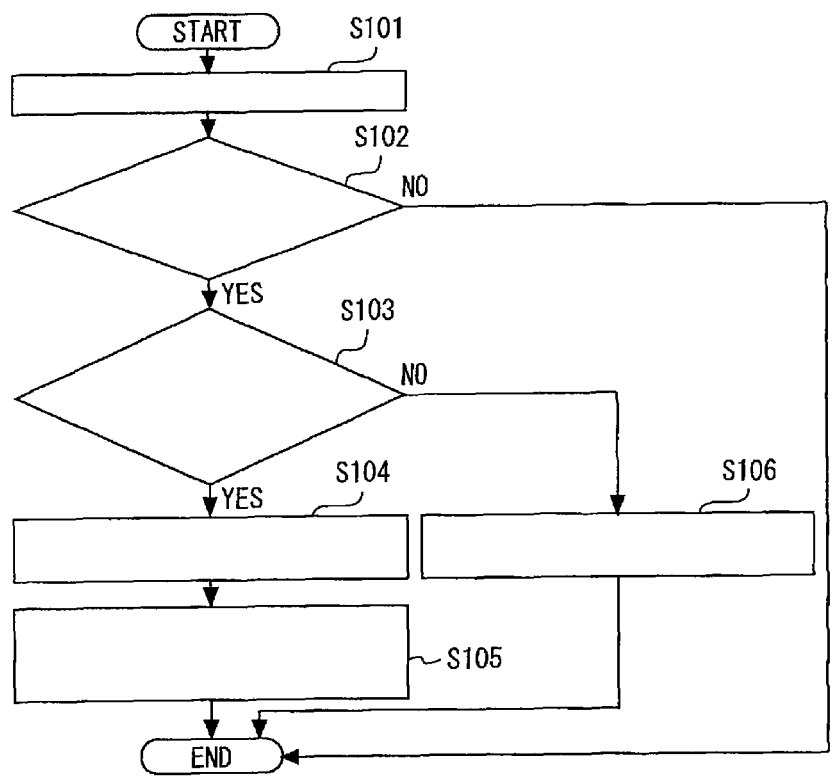

S101 : REMOTE HALL CALL REGISTRATION REQUEST IS RECEIVED
S102 : IS FLOOR ON WHICH REMOTE HALL CALL REGISTERING DEVICE IS INSTALLED THE PARKING FLOOR ?
S103 : (PREDICTED MOVING TIME OF ELEVATOR Te)−(PREDICTED WALKING TIME Tw) ≧ (ALLOWABLE TIME Ta)
S104 : CAR ARRANGEMENT TO FLOOR ON WHICH REMOTE HALL CALL REGISTERING DEVICE IS INSTALLED IS PERMITTED
S105 : AFTER FINISH OF SERVICES TO ALL CALLS, CARRY OUT CAR ARRANGEMENT TO FLOOR ON WHICH REMOTE HALL CALL REGISTERING DEVICE IS INSTALLED
S106 : CAR ARRANGEMENT TO FLOOR ON WHICH REMOTE HALL CALL REGISTERING DEVICE IS INSTALLED IS NOT PERMITTED

Fig. 8

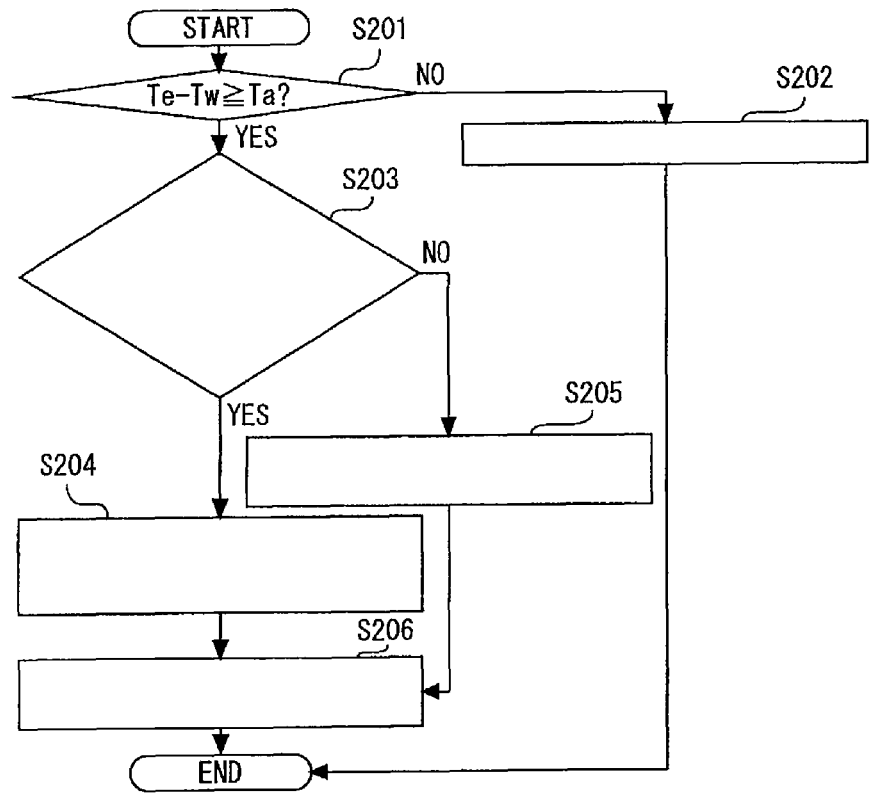

S202 : CAR ARRANGEMENT TO OTHER FLOORS IS NOT PERMITTED
S203 : IS THERE CANDIDATE FOR PARKING FLOOR BETWEEN SERVICE FLOOR AFTER FINISH OF SERVICES TO ALL CALLS AND FLOOR ON WHICH REMOTE HALL CALL REGISTERING DEVICE IS INSTALLED ?
S204 : SET FLOOR NEAREST TO SERVICE FLOOR AFTER FINISH OF SERVICES TO ALL CALLS AS PARKING FLOOR AMONG CANDIDATES FOR PARKING FLOOR
S205 : SET FLOOR ON WHICH REMOTE HALL CALL REGISTERING DEVICE IS INSTALLED AS PARKING FLOOR
S206 : CARRY OUT CAR ARRANGEMENT TO PARKING FLOOR AFTER FINISH OF SERVICES TO ALL CALLS

ELEVATOR SYSTEM AND ELEVATOR GROUP CONTROL SYSTEM THAT INCLUDES A STANDBY OPERATION

TECHNICAL FIELD

The present invention relates to an elevator system which controls an elevator and a group control system which performs group control of a plurality of elevators.

BACKGROUND ART

In some elevators, in order to improve services to users, when services to all calls (hall calls and car calls) have been finished, a car is moved to a specific floor having a high frequency of use (a parking floor), such as a lobby floor, and the car is caused to be on standby.

For example, as a conventional technique, an elevator system in which a parking floor is changed for a specific period of time of the day has been proposed (refer to Patent Literature 1, for example). Specifically, in the elevator system described in Patent Literature 1, a parking floor for each specific period of time of the day is determined so that the car waiting time of those who want to board a car becomes minimized by detecting the boarding time of passengers, the floors at which passengers get on and off the car, the direction of travel of the car and the like.

CITATION LIST

Patent Literature

Patent Literature 1: Japanese Patent Laid-Open No. 2005-324953

SUMMARY OF INVENTION

Technical Problem

In conventional elevators having the function of standby operation, including those described in Patent Literature 1, the elevator car which has finished services to all calls is moved to a parking floor without exception, posing the problem that the number of runs and the running distance increase, resulting in increased energy consumption of elevators.

The present invention was made to solve the problem described above, and an object of the invention is to provide an elevator system and an elevator group control system which prevent an increase in the number of runs and the running distance and can reduce energy consumption in systems which perform a standby operation for causing an elevator car to be on standby at a prescribed parking floor.

Solution to Problem

An elevator system of the invention is a system which controls an elevator by responding to hall calls of each floor and car calls and performs a standby operation for causing an elevator car to be on standby at a prescribed parking floor under prescribed conditions. The elevator system of the invention comprises a remote hall call registering device by use of which an elevator passenger performs a hall call registration in a position at a prescribed distance from a hall, comparison means which, in the case where a floor on which the remote hall call registering device is installed is set as a parking floor, compares the moving time which the elevator car requires for moving from a service floor at which the elevator car has been stopped at the time of the finish of responses to all calls to the floor on which the remote hall call registering device is installed, with the walking time which a passenger requires for moving from the installation position of the remote hall call registering device to the boarding position of the elevator, standby operation go/no go determination means which determines whether to perform a standby operation on the basis of the result of the comparison of the comparison means, and standby operation means which, only in the case where a determination was made by the standby operation go/no go determination means to the effect that a standby operation should be performed, causes the elevator car to move to the parking floor after responses to all calls have been finished.

An elevator system of the invention is a system which controls an elevator by responding to hall calls of each floor and car calls and performs a standby operation for causing an elevator car to be on standby at a prescribed parking floor under prescribed conditions. The elevator system of the invention comprises a remote hall call registering device by use of which an elevator passenger performs a hall call registration in a position at a prescribed distance from a hall, standby operation go/no go determination means which, in the case where a floor on which the remote hall call registering device is installed is set as a parking floor, makes a determination to the effect that the standby operation should be performed in the case where a service floor at which the elevator car has been stopped at the time of the finish of responses to all calls corresponds to a prescribed parking-prohibited floor, and makes a determination to the effect that the standby operation should not be performed in the case where the service floor does not correspond to the parking-prohibited floor, and standby operation means which, only in the case where a determination was made by the standby operation go/no go determination means to the effect that a standby operation should be performed, causes the elevator car to move to the parking floor after responses to all calls have been finished.

An elevator system of the invention is a system which controls an elevator by responding to hall calls of each floor and car calls and performs a standby operation for causing an elevator car to be on standby at a prescribed parking floor under prescribed conditions. The elevator system of the invention comprises a remote hall destination call registering device by use of which an elevator passenger performs an automatic registration of a hall call and a destination call in a position at a prescribed distance from a hall by performing a prescribed authentication operation, determination means which makes a determination as to whether or not a destination floor of a passenger authenticated by the remote hall destination call registering device as an pre-registered person, corresponds to any of being invalid, being unregistered, and being the same as the floor on which the remote hall destination call registering device is installed, and in-advance standby elevator moving means which moves an elevator car to the floor on which the remote hall destination call registering device is installed if, in the case where a determination was made by the determination means to the effect that the destination floor corresponds to any of the cases, the elevator car is on standby at a floor other than the floor on which the remote hall destination call registering device is installed.

An elevator group control system of the invention is a system which performs group control of a plurality of elevators and performs a standby operation for causing an elevator car to be on standby at a prescribed parking floor under prescribed conditions. The elevator group control system of the invention comprises a remote hall call registering device by use of which an elevator passenger performs a hall call registration in a position at a prescribed distance from a hall, comparison means which, in the case where a floor on which the remote hall call registering device is installed is set as a parking floor for at least one elevator, compares the moving time which an elevator car requires for moving from a service floor at which the elevator car has been stopped at the time of the finish of responses to all calls to the floor on which the remote hall call registering device is installed, with the walking time which a passenger requires for moving from the installation position of the remote hall call registering device to the boarding position of the elevator, standby operation go/no go determination means which determines whether to perform a standby operation on the basis of the result of the comparison of the comparison means, and standby operation means which, only in the case where a determination was made by the standby operation go/no go determination means to the effect that a standby operation should be performed and the number of elevator cars on standby at the floor on which the remote hall call registering device is installed is smaller than a prescribed number, causes an elevator car to move to the parking floor after responses to all calls have been finished.

An elevator group control system of the invention is a system which performs group control of a plurality of elevators and performs a standby operation for causing an elevator car to be on standby at a prescribed parking floor under prescribed conditions. The elevator group control system of the invention comprises a remote hall call registering device by use of which an elevator passenger performs a hall call registration in a position at a prescribed distance from a hall, standby operation go/no go determination means which, in the case where a floor on which the remote hall call registering device is installed is set as a parking floor for at least one elevator, makes a determination to the effect that the standby operation should be performed in the case where a service floor at which an elevator car has been stopped at the time of the finish of responses to all calls corresponds to a prescribed parking-prohibited floor, and makes a determination to the effect that the standby operation should not be performed in the case where the service floor does not correspond to the parking-prohibited floor, and standby operation means which, only in the case where a determination was made by the standby operation go/no go determination means to the effect that a standby operation should be performed and the number of elevator cars on standby at the floor on which the remote hall call registering device is installed is smaller than a prescribed number, causes an elevator car to move to a parking floor after responses to all calls have been finished.

An elevator group control system of the invention is a system which performs group control of a plurality of elevators and performs a standby operation for causing an elevator car to be on standby at a prescribed parking floor under prescribed conditions. The elevator group control system of the invention comprises a remote hall destination call registering device by use of which an elevator passenger performs an automatic registration of a hall call and a destination call in a position at a prescribed distance from a hall by performing a prescribed authentication operation, determination means which makes a determination as to whether or not a destination floor of a passenger authenticated by the remote hall destination call registering device as an pre-registered person, corresponds to any of being invalid, being unregistered, and being the same as the floor on which the remote hall destination call registering device is installed, and in-advance standby elevator moving means, which moves an elevator car to the floor on which the remote hall destination call registering device is installed if the elevator car is on standby at a floor other than the floor on which the remote hall destination call registering device is installed, in the case where a determination was made by the determination means to the effect that the destination floor corresponds to any of the cases.

Advantageous Effects of Invention

According to the present invention, in a system which performs a standby operation for causing an elevator car to be on standby at a prescribed parking floor, it becomes possible to prevent an increase in the number of runs and the running distance and to reduce energy consumption.

BRIEF DESCRIPTION OF DRAWINGS

FIG. 3 is a flowchart showing the actions of the elevator system in the first embodiment according to the present invention.

FIG. 8 is a flowchart showing the actions of the elevator system in the third embodiment according to the present invention.

DESCRIPTION OF EMBODIMENTS

The present invention will be described in more detail with reference to the accompanying drawings. Incidentally, in each of the drawings, like numerals refer to like or similar parts and redundant descriptions of these parts are appropriately simplified or omitted.

First Embodiment

Figure 1:
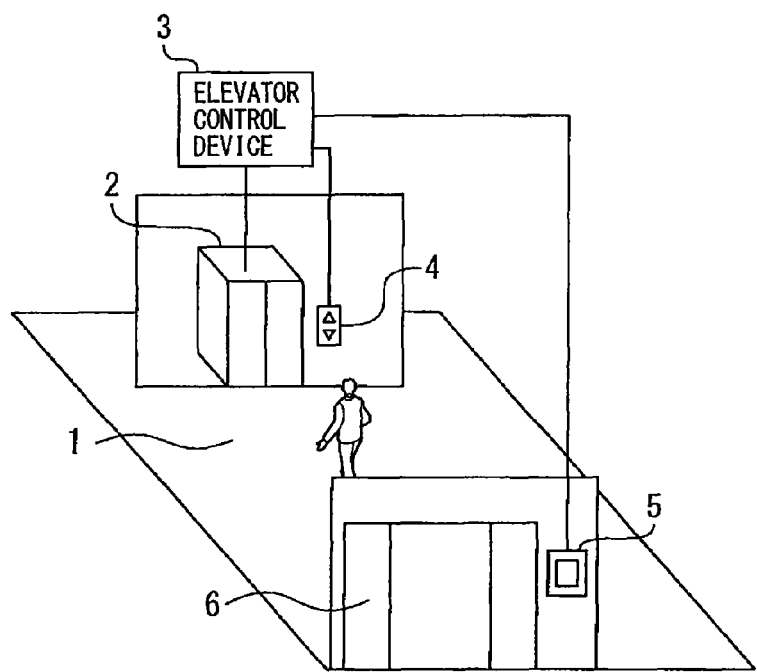
FIG. 1 is a diagram showing an elevator system in a first embodiment according to the present invention.
Figure 2:
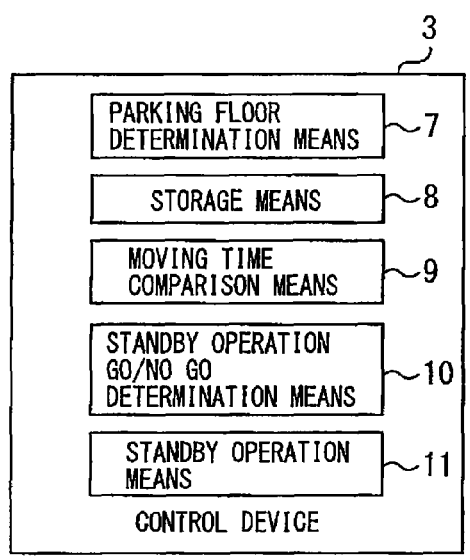
FIG. 2 is a block diagram of an elevator control device shown in FIG. 1.

FIG. 1 is a diagram showing an elevator system in a first embodiment according to the present invention, and FIG. 2 is a block diagram of an elevator control device shown in FIG. 1.

In FIGS. 1 and 2, reference numeral 1 denotes an elevator hall (hereinafter referred to also simply as a "hall") and reference numeral 2 denotes a car which ascends and descends in an elevator shaft. The car 2 is provided with a car call button (not shown) which an elevator passenger pushes in registering a car call. When a passenger pushes the car call button in the car 2, a car call registration request is sent from the car 2 (an operating panel of the car 2) to a control device 3. Reference numeral 4 denotes a hall button which an elevator passenger pushes in registering a hall call in front of an elevator entrance in the hall 1. The hall button 4 is installed in the elevator hall 1 of each floor. When a passenger pushes the hall button 4 in the hall 1, a hall call registration request is sent from the hall 1 (the operating panel of the hall 1) to the control device 3.

The control device 3 performs the general operation control of an elevator. The control device 3 registers a hall call by receiving the hall call registration request and registers a car call by receiving the car call registration request. The control device 3 appropriately controls the operation of each piece of equipment by sequentially causing the elevator (the elevator car 2) to respond to registered calls (hall calls of each floor and car calls).

This elevator system is provided with a remote hall call registering device 5 by use of which an elevator passenger performs a hall call registration in a position at a prescribed distance from the hall 1. The remote hall call registering device 5 is installed, for example, in the vicinity of a common entrance of a lobby floor, in a passage of a lobby floor, in the hall 1 of a lobby floor and the like. FIG. 1 shows, as an example, the case where the remote hall call registering device 5 is installed in the vicinity of a door 6 to enter the hall 1. The remote hall call registering device 5 sends a remote hall call registration request to the control device 3 when a passenger performs a prescribed operation. The control device 3 registers a hall call by receiving the remote hall call registration request and causes the elevator car to respond appropriately.

In addition to the function of controlling the elevator in response to hall calls from each floor and from a remote place and car calls from the car 2, this control device 3 has also the function of performing a standby operation for causing the elevator (the elevator car 2) to be on standby at a prescribed parking floor under prescribed conditions. In order to realize these functions, the control device 3 is provided with parking floor determination means 7, storage means 8, moving time comparison means 9, standby operation go/no go determination means 10, and standby operation means 11.

Figure 4:
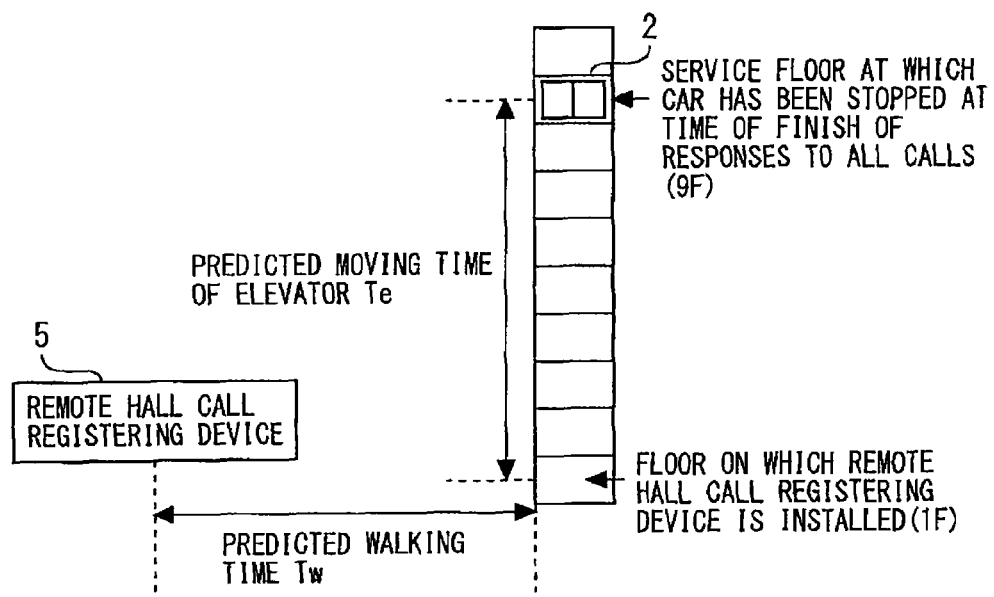
FIG. 4 is a diagram to explain the function of the elevator system in the first embodiment according to the present invention.

Referring to also FIGS. 3 and 4, the functions peculiar to this elevator system (in particular, the control device 3) will be described below. FIG. 3 is a flowchart showing the actions of the elevator system in the first embodiment according to the present invention, and FIG. 4 is a diagram to explain the function thereof.

The control device 3 constantly makes a determination as to whether or not a remote hall call registration request has been received from the remote hall call registering device 5. Upon receipt of a remote hall call registration request from the remote hall call registering device 5 (S101), with the aid of the parking floor determination means 7, the control device 3 makes a determination as to whether or not the floor on which the remote hall call registering device 5 is installed, which has sent the remote hall call registration request (that is, on which a call input operation was performed by a passenger), coincides with the parking floor (S102). The information on parking floors is stored in advance in the storage means 8. When a determination is made by the parking floor determination means 7 to the effect that the floor on which the remote hall call registering device 5 is installed does not coincide with the parking floor, the control device 3 finishes the processing.

On the other hand, in the case where the floor on which the remote hall call registering device 5 is installed is set as a parking floor (Yes in S102), next, with the aid of the moving time comparison means 9, the control device 3 makes a determination as to whether or not the following formula holds (S103):

$$Te - Tw \geq Ta \quad (1)$$

where

Te: A period of time required by the elevator (the elevator car 2) for moving from a service floor at which the elevator car has been stopped at the time of the finish of responses to all registered calls (hall calls and car calls) to a floor on which the remote hall call registering device 5 is installed, which is a parking floor (hereinafter referred to also as "the predicted moving time")

Tw: A period of time required by an elevator passenger who performed a call input operation using the remote hall call registering device 5 for moving on foot from the installation position of the remote hall call registering device 5 to the boarding position of the elevator (hereinafter referred to also as "the predicted walking time")

Ta: A period of time for which a passenger is allowed to wait for the arrival of the elevator car in the hall 1 (hereinafter referred to also as "the allowable time").

FIG. 3 shows an example of the predicted moving time Te and predicted walking time Tw. As shown in FIG. 3, in the case where a service floor at which the car has been stopped at the time of the finish of services to all calls is the 9th floor, which belongs to the upper floors of a building, the time Te is required by the elevator car for moving to the floor on which the remote hall call registering device 5 is installed, which is the bottom floor (the 1st floor). Because the remote hall call registering device 5 is installed in a place away from the hall 1 of the 1st floor, a passenger requires the time Tw for moving on foot to the boarding position of the elevator after operating the remote hall call registering device 5. The predicted walking time Tw can be easily calculated from the distance from the remote hall call registering device 5 to the elevator and a general walking speed of passengers (for example, 1.0 m/sec).

The moving time comparison means 9 makes a comparison between the predicted moving time Te and the predicted walking time Tw, and makes a determination as to whether or not a value obtained by subtracting the predicted walking time Tw from the predicted moving time Te is not less than the allowable time Ta. For example, values of the order of 5 seconds are set as the allowable time Ta. In the case where the convenience for elevator passengers is taken into consideration, it is possible to set the allowable time Ta at not more than 0 second. That is, negative values may be set as the allowable time Ta.

The standby operation go/no go determination means 10 has the function of making a determination as to whether or not a standby operation should be performed on the basis of the result of the comparison by the moving time comparison means 9. For example, when the moving time comparison means 9 determines that Formula 1 described above holds, the standby operation go/no go determination means 10 permits the carrying out of a standby operation (car arrangement to the floor on which the remote hall call registering device 5 is installed) (S104). When a determination is made by the standby operation go/no go determination means 10 to the effect that a standby operation should be performed, the standby operation means 11 makes a check as to whether or not services by the elevator have all been finished. The standby operation means 11 starts a standby operation after responses to all calls have been finished, and moves the elevator car to a parking floor (S105).

On the other hand, in the case where it is determined by the moving time comparison means 9 that Formula 1 described above does not hold, the standby operation go/no go determination means 10 does not permit the carrying out of a standby operation (S106). As a result of this, the control device 3 finishes a series of processing actions without performing a standby operation. That is, only in the case where the carrying out of a standby operation is permitted by the standby operation go/no go determination means 10, the standby operation means 11 shifts to a standby operation after the finish of services to all calls and moves the car 2 to a parking floor.

In the elevator system of the above-described configuration, for example, in the case where during the time when an elevator passenger moves from the remote hall call registering device 5 to in front of the elevator, the elevator car can move from a service floor after the finish of services to the floor on which the remote hall call registering device 5 is installed (Ta=0, Te≤Tw), the elevator (the elevator car 2) can continue being on standby at the service floor after services to all calls have been finished. In the case where during the time when an elevator passenger moves from the remote hall call registering device 5 to in front of the elevator, the elevator car cannot move from a service floor after the finish of services to the floor on which the remote hall call registering device 5 is installed (Ta=0, Te≥Tw), the elevator car moves to the floor on which the remote hall call registering device 5 is installed after services to all calls have been finished and then becomes on standby.

For this reason, on the floor on which the remote hall call registering device 5 is installed, such as a lobby floor having a high frequency of use, it is possible to provide comfortable services without an increase in the waiting time of passengers. Furthermore, because a standby operation is performed only when the standby action is necessary, the number of runs and running distance of the elevator car decrease and it is possible to reduce energy consumption. In the case where the elevator car continues being on standby at the service floor after the finish of services to all calls, it is possible to shorten the moving time to floors other than the floor on which the remote hall call registering device 5 is installed. For this reason, it is also possible to increase the operation efficiency as the whole system.

In this embodiment, the description was given of the case where only a hall call registration is performed from the remote hall call registering device 5. However, it is possible to adopt a configuration in which both hall calls and destination calls can be registered from the remote hall call registering device 5 by giving the personal authentication function to the remote hall call registering device 5. In this case, when prescribed information, such as the card information of an IC card, is inputted, the remote hall call registering device 5 performs personal authentication by checking the input information against pre-registered information. When the authentication is successful because of agreement between the input information and the pre-registered information, the remote hall call registering device 5 automatically sends a remote hall call registration request of the floor on which the remote hall call registering device 5 is installed and a destination call registration request corresponding to the destination floor of the authenticated person to the control device 3. For personal authentication, biometric information using a fingerprint, an iris pattern and the like may be used.

In this embodiment, the description was given of the case where a comparison is made between the predicted moving time Te and the predicted walking time Tw with the aid of the moving time comparison means 9. However, in S103 of FIG. 3, the moving time comparison means 9 may make a determination as to whether or not the following formula holds instead of Formula 1 described above:

$$We \geq \alpha Tw \qquad (2)$$

where

We: Amount of energy consumed which is necessary for moving the elevator (the elevator car 2) from a service floor at which the car has been stopped at the time of finish of responses to all registered calls (hall calls and car calls) to the floor on which the remote hall call registering device 5 is installed, which is a parking floor α: Preset parameter That is, in S103 the moving time comparison means 9 makes a comparison between the amount of energy consumed We and the predicted walking time Tw. The amount of energy consumed We can be calculated easily by presetting the unit energy consumed which is necessary for moving the elevator car over one floor (or the unit distance). The standby operation go/no go determination means 10 permits the carrying out of a standby operation when Formula 2 above holds (S104), and does not permit the carrying out of a standby operation when Formula 2 above does not hold (S106).

Although the foregoing is the description of the elevator system controlling one elevator, the function peculiar to this embodiment can also be applied to a group control system which performs group control of a plurality of elevators.

In this case, for example, the functions of each means 7 to 11 described above are added as required to a group control device controlling a plurality of control devices 3, and the actions of flow shown in FIG. 3 is carried out. At this time, upon receipt of a remote hall call registration request from the remote hall call registering device 5, the parking floor determination means 7 makes a determination as to whether or not the floor on which the remote hall call registering device 5 is installed, which has sent the remote hall call registration request, is set as a parking floor for any of the elevators. A standby operation may be performed by all of the elevators in which a group control device performs group control, or may be performed by part of the elevators.

In the case where the floor on which the remote hall call registering device 5 is installed is set as a parking floor for at least one elevator, the moving time comparison means 9 makes a comparison given in Formula 1 (or Formula 2) for each elevator. Only in the case where the number of elevators on standby at the floor on which the remote hall call registering device 5 is installed, is smaller than a prescribed number, the standby operation means 11 carries out a standby operation for an elevator for which determination was made by the standby operation go/no go determination means 10 to the effect that a standby operation should be performed.

The determination as to whether or not the number of elevators on standby at the floor on which the remote hall call registering device 5 is installed is smaller than a prescribed number, may be made before the processing in S103. With this configuration, in the case where elevator cars whose number is larger than a required number are on standby at the floor on which the remote hall call registering device 5 is installed, it is possible to finish the processing without determinations by the moving time comparison means 9 and the standby operation go/no go determination means 10.

Second Embodiment

Figure 5:
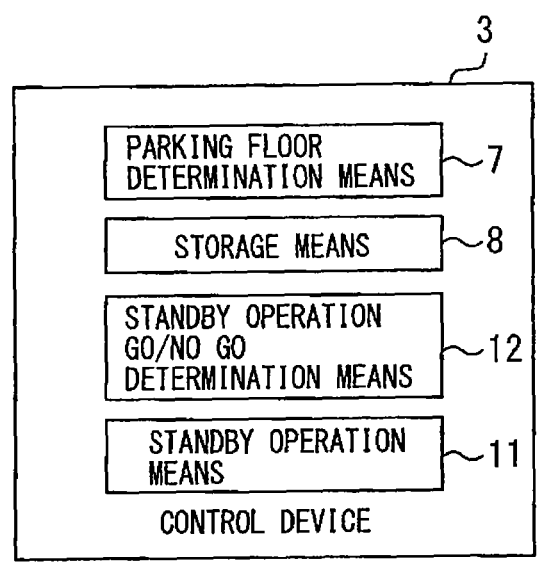
FIG. 5 is a diagram showing the principal part of an elevator system in a second embodiment according to the present invention.

FIG. 5 is a diagram showing the principal part of an elevator system in a second embodiment according to the present invention and shows the configuration of a control device 3 in this embodiment. The control device 3 is provided with parking floor determination means 7, storage means 8, standby operation go/no go determination means 12, and standby operation means 11. In this embodiment, the control device 3 is not provided with moving time comparison means 9. The standby operation go/no go determination means 12 has a function peculiar to this embodiment. Other components, including those of parts other than the control device 3, are the same as in the first embodiment.

The standby operation go/no go determination means 12 has the function of making a determination as to whether or not a standby operation should be performed. Specifically, after the processing of S101 and S102 of FIG. 3 is performed, in S103 the standby operation go/no go determination means 12 makes a determination as to whether or not the service floor at which the elevator car has been stopped at the time of the finish of responses to all registered calls (hall calls and car calls) corresponds to a preset parking-prohibited floor.

In the case where the elevator car stops at the parking-prohibited floor when responses to all calls have been finished, the standby operation go/no go determination 12 makes a determination to the effect that a standby operation should be performed. That is, the flow of processing proceeds to the processing actions of S104 and S105, and car arrangement to the floor on which the remote hall call registering device 5 is installed is performed after the finish of all services. On the other hand, in the case where the elevator car stops at a floor other than the parking-prohibited floor when responses to all calls have been finished, the standby operation go/no go determination means 12 makes a determination to the effect that a standby operation should not be performed. In this case, in S106 the standby operation means 11 does not permit car arrangement to the floor on which the remote hall call registering device 5 is installed, and the control device 3 finishes a series of processing actions. The information on the parking-prohibited floor can be stored in advance in the storage means 8.

Figure 6:
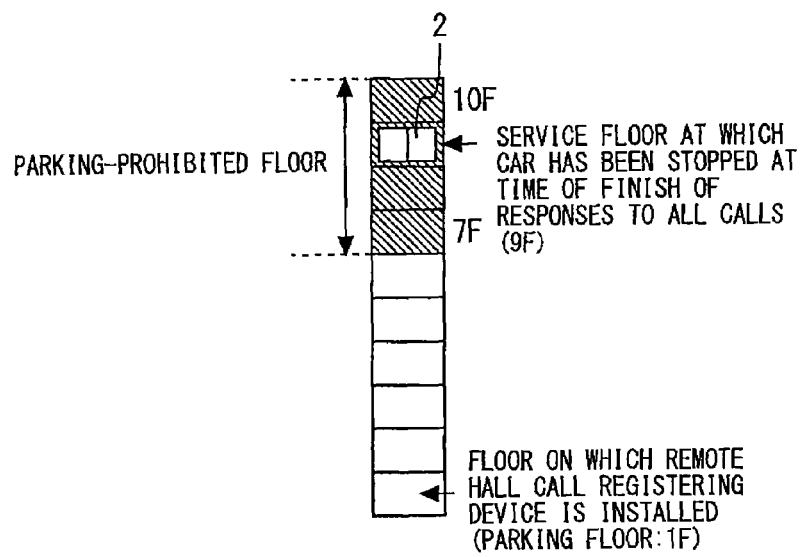
FIG. 6 is a diagram to explain the function of the elevator system in the second embodiment according to the present invention.

FIG. 6 is a diagram to explain the function of the elevator system in the second embodiment according to the present invention, and shows an example of setting parking-prohibited floors. As shown in FIG. 6, in the case where the 7th floor to the 10th floor, including the top floor of a building, are set as parking-prohibited floors, a standby operation is performed in the case where the service floor at which the elevator car has been stopped at the time of the finish of services to all calls is any of the 7th floor to the 10th floor. On the other hand, in the case where the above-described service floor is any of the floors of the 1st floor to the 6th floor, a standby operation is not performed and the elevator car continues being at a stop at the service floor.

Also in the elevator system having the above-described configuration, the same effects as in the first embodiment can be expected.

That is, on a floor on which the remote hall call registering device 5 is installed, such as a lobby floor having a high frequency of use, it is possible to provide comfortable services without an increase in the waiting time of passengers. Furthermore, because a standby operation is performed only in the prescribed case where a standby action is necessary, the number of runs and the running distance of the elevator car decrease and the energy consumption can be reduced. In the case where the elevator car continues being on standby at the service floor after the finish of services to all calls, it is possible to shorten the moving time to floors other than the floor on which the remote hall call registering device 5 is installed. For this reason, it is also possible to increase the operation efficiency as the whole system.

Although the foregoing is a description of the elevator system controlling one elevator, the function peculiar to this embodiment can also be applied to a group control system which performs group control of a plurality of elevators.

In this case, for example, the functions of each means 7 and 8, 11 and 12 described above are added as required to a group control device controlling a plurality of control devices 3, and the flow of actions shown above is carried out. At this time, upon receipt of a remote hall call registration request from the remote hall call registering device 5, the parking floor determination means 7 makes a determination as to whether or not the floor on which the remote hall call registering device 5 is installed, which has sent the remote hall call registration request, is set as a parking floor for any of the elevators. A standby operation may be performed by all of the elevators in which a group control device performs group control, or may be performed by part of the elevators.

Furthermore, in the case where the floor on which the remote hall call registering device 5 is installed is set as a parking floor for at least one elevator, the standby operation go/no go determination means 12 makes a determination as to whether or not the service floor at which the elevator car has been stopped at the time of the finish of responses to all registered calls corresponds to a preset parking-prohibited floor for each elevator. Only in the case where the number of elevators on standby at the floor on which the remote hall call registering device 5 is installed, is smaller than a prescribed number, the standby operation means 11 carries out a standby operation for an elevator for which the standby operation go/no go determination means 12 made a determination to the effect that a standby operation should be performed.

The determination as to whether or not the number of elevators on standby at the floor on which the remote hall call registering device 5 is installed is smaller than a prescribed number, may be made before the determination by the standby operation go/no go determination means 12.

Third Embodiment

Figure 7:
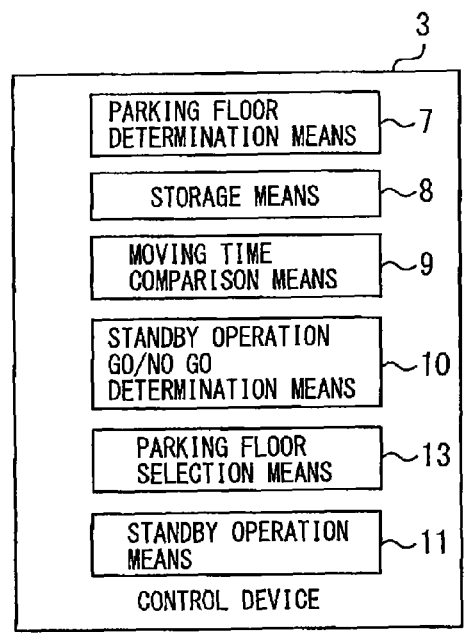
FIG. 7 is a diagram showing the principal part of an elevator system in a third embodiment according to the present invention.

FIG. 7 is a diagram showing the principal part of an elevator system in a third embodiment according to the present invention and shows the configuration of a control device 3 in this embodiment. The control device 3 is provided with parking floor selection means 13 in addition to each means 7 to 11 described above. Other components, including those of parts other than the control device 3, are the same as in the first embodiment.

Figure 9:
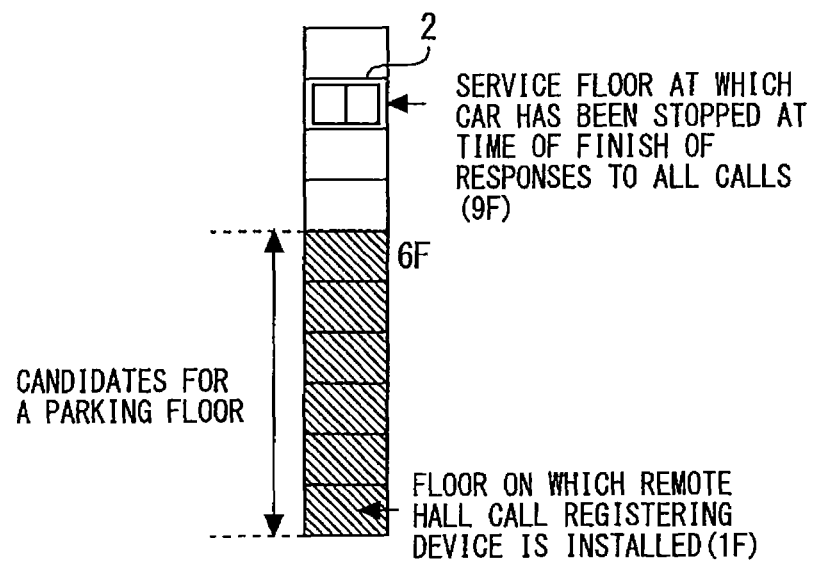
FIG. 9 is a diagram to explain the function of the elevator system in the third embodiment according to the present invention.

Referring to also FIGS. 8 and 9, the functions peculiar to this elevator system (in particular, the control device 3) will be described below. FIG. 8 is a flowchart showing the actions of the elevator system in the third embodiment according to the present invention, and FIG. 9 is a diagram to explain the function thereof.

The processing of S201 shown in FIG. 8 is the same as the processing of S103 of FIG. 3. That is, the control device 3 performs the same processing as in S101 and S102 before the processing of S201. The control device 3 may make the comparison given in Formula 2 above in the processing of S201.

In the case where in S201 it is determined by the moving time comparison means 9 that Formula 1 described above does not hold, the standby operation go/no go determination means 10 does not permit the carrying out of a standby operation (S202). As a result of this, when services to all calls have been finished, the elevator car becomes on standby at the service floor.

On the other hand, in the case where in S201 it is determined by the moving time comparison means 9 that Formula 1 described above holds, the standby operation go/no go determination means 10 makes a determination to the effect that a standby operation should be performed. When the standby operation go/no go determination means 10 permits the carrying out of a standby operation (Yes in S201), the parking floor selection means 13 makes a determination as to whether or not there is a prescribed candidate for a parking floor between a service floor at which the elevator car has been stopped at the time of the finish of responses to all registered calls and the floor on which the remote hall call registering device 5 is installed (S203).

Incidentally, the candidate for a parking floor refers to a floor capable of being selected as a parking floor to be used when a standby operation is performed and is appropriately determined under prescribed conditions and the like, or is preset. For example, a floor which is such that the elevator car can move to the floor on which the remote hall call registering device 5 is installed within the walking time required by an elevator passenger for moving on foot from the remote hall call registering device 5 to in front of the elevator, is set as the candidate for a parking floor. In addition, a floor which is set in advance or a floor other than a floor preset as a parking-prohibited floor may be taken into consideration as the candidate for a parking floor. Information related to a candidate for a parking floor (conditions for setting, information on the candidate for a parking floor itself and the like) is stored in advance in the storage means 8.

When in S203 the parking floor selection means 13 makes a determination to the effect that there is a candidate for a parking floor, the parking floor selection means 13 sets the floor as a parking floor. For example, in the case where there is a plurality of candidates for a parking floor satisfying the conditions of S203, the parking floor selection means 13 selects a floor nearest to the above-described service floor at the time of finish of services as a parking floor from among these candidates for a parking floor (S204). On the other hand, when in S203 the parking floor selection means 13 makes a determination to the effect that there is no candidate for a parking floor, the parking floor selection means 13 selects the floor on which the remote hall call registering device 5 is installed as a parking floor (S205). When the setting of a parking floor is finished in S204 or S205, the standby operation means 11 checks whether or not all of the services by the elevator have been finished. After the finish of responses to all calls, the standby operation means 11 starts a standby operation and moves the elevator car to the set parking floor (S206).

FIG. 9 shows an example of the candidates for a parking floor. As shown in FIG. 9, in the case where floors from the 1st floor to the 6th floor are set as candidates for a parking floor and the elevator car stops at the 9th floor when services to all calls have been finished, the parking floor selection means 13 sets the 6th floor, which is a floor nearest to the 9th floor, as a parking floor.

Also in the elevator system of the above-described configuration, it is possible to produce the same effects as in the first embodiment.

That is, on a floor on which the remote hall call registering device 5 is installed, such as a lobby floor having a high frequency of use, it is possible to provide comfortable services without an increase in the waiting time of passengers. Furthermore, because a standby operation is performed only in the case where a standby action is necessary, the number of runs and running distance of the elevator car decrease and the energy consumption can be reduced. In the case where the elevator car continues being on standby at the service floor after the finish of services to all calls, it is possible to shorten the moving time to floors other than the floor on which the remote hall call registering device 5 is installed. For this reason, it is also possible to increase the operation efficiency as the whole system.

The function of the parking floor selection means 13 described in this embodiment may be applied to the configuration of the second embodiment. In this case, it is necessary only that the parking floor selection means 13 be added to the control device 3 of the configuration shown in FIG. 5 and that the same processing as the processing shown in FIG. 8 be performed.

Fourth Embodiment

Figure 10:
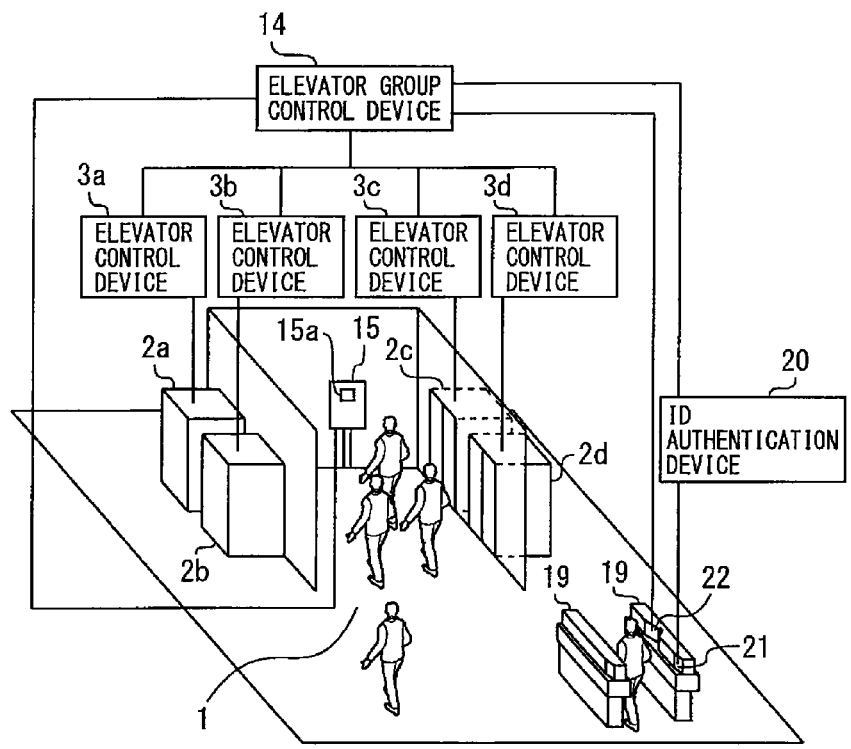
FIG. 10 is a diagram showing an elevator group control system in a fourth embodiment according to the present invention.
Figure 11:
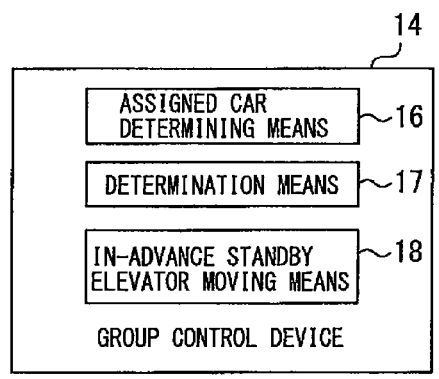
FIG. 11 is a block diagram of an elevator group control device shown in FIG. 10.

FIG. 10 is a diagram showing an elevator group control system in a fourth embodiment according to the present invention, and FIG. 11 is a block diagram of the elevator group control device shown in FIG. 10.

In FIGS. 10 and 11, reference numeral 14 denotes a group control device which controls a plurality of elevators as a group, reference numerals 2a to 2d denote elevator cars, and reference numerals 3a to 3d denote control devices which perform the operation control of each of the elevators. FIG. 10 shows, as an example, the case where the group control device 14 performs the group control of four elevators (i.e., control devices 3a to 3d). In the following, unless it is necessary to specify any of the cars and control devices, the expressions of car 2 and control device 3 are simply used.

Reference numeral 15 denotes a hall destination call registering device installed in an elevator hall 1. The hall destination call registering device 15 is a device by use of which an elevator passenger performs a hall call registration and a destination call registration in the hall 1. For example, the hall destination call registering device 15 is provided with a numeric keypad or a touch panel, and a passenger inputs his or her destination floor by operating the numeric keypad or the touch panel. When an appropriate destination floor input is performed, a hall call registration request corresponding to the floor on which the hall destination call registering device 15 is provided and a destination call registration request corresponding to the inputted destination floor are sent from the hall destination call registering device 15 to the group control device 14.

The group control device 14 is provided with assigned car determining means 16, determination means 17, and in-advance standby elevator moving means 18. The assigned car determining means 16 has the function of determining an assigned car. For example, upon receipt of a hall call registration request and a destination call registration request from the hall destination call registering device 15, the assigned car determining means 16 registers these calls and determines a corresponding assigned car. Information on an assigned car determined by the assigned car determining means 16 is sent to a corresponding control device 3 and the hall destination call registering device 15. The control device 3 which has received the information on the assigned car performs control to cause the relevant elevator to respond to the hall call and the destination call. The hall destination call registering device 15 is provided with an indication device 15a, and upon receipt of information on an assigned car from the group control device 14, the hall destination call registering device 15 causes the indication device 15a to indicate information for identifying the assigned car (for example, elevator number "A").

This group control system is provided with a remote hall destination call registering device by use of which an elevator passenger performs the automatic registration of a hall call and a destination call in a place at a prescribed distance from the hall 1. The remote hall destination call registering device has, for example, the function of personal authentication, and an elevator passenger performs the automatic registration of a call by performing a prescribed authentication operation on the remote hall destination call registering device. That is, when prescribed information, such as card information of an IC card or pattern information of a fingerprint or an iris, is inputted, the remote hall destination call registering device performs personal authentication by checking the input information against pre-registered information. When the authentication is successful due to the agreement between the input information and the pre-registered information, the remote hall destination call registering device automatically sends to the group control device 14 a remote hall call registration request of the floor on which the remote hall destination call registering device is installed and a destination call registration request corresponding to the destination floor of the authenticated person.

In this embodiment, the case where the above-described remote hall destination call registering device is composed of a security gate 19 and an ID authentication device 20, is presented as an example. The security gate 19 is installed, for example, in the vicinity of a common entrance to the lobby floor, in the passage of the lobby floor, and in the hall 1 of the lobby floor. When a person who is passing through the security gate 19 (hereinafter referred to as merely "a passer") holds his or her own ID card to a card reader 21, the card information is read by the card reader 21. Upon reading the card information, the card reader 21 sends the read card information to the ID authentication device 20.

Card information on a passage-permitted person to whom the passage through the security gate 19 is permitted and the destination floor corresponding to the card information (i.e., the destination floor of the passage-permitted person) are registered in the ID authentication device 20 in advance by being correlated to each other. Upon receipt of card information from the card reader 21, the ID authentication device 20 makes a determination as to whether or not the received card information has been registered in advance (that is, whether the passer is a passage-permitted person). When the received card information agrees with the pre-registered card information, the ID authentication device 20 recognizes that the passer is the passage-permitted person and permits the passage through the security gate 19. Furthermore, in the case where the passer is the passage-permitted person, the ID authentication device 20 sends to the group control device 14 a remote hall call registration request corresponding to the floor on which the security gate 19 is installed and a destination call registration request corresponding to the destination floor of the passage-permitted person.

Upon receipt of the remote hall call registration request and the destination call registration request from the ID authentication device 20, the group control device 14 registers these calls and assigns the registered calls to any car 2 with the aid of the assigned car determining means 16. The assigned car determining means 16 performs the determination of the assigned car in consideration of, for example, the predicted arrival time at the floor on which the security gate 19 is installed, and the predicted number of stops of each car 2.

When the group control device 14 performs the determination of an assigned car on the basis of a request from the ID authentication device 20, the group control device 14 sends the information on the assigned car to a corresponding control device 3 and an assigned elevator indicator 22. The assigned elevator indicator 22 is intended for performing the indication of an assigned car to a passer through the security gate 19 and is installed in the security gate 19 or in the vicinity thereof. Upon receipt of information on an assigned car from the group control device 14, the assigned elevator indicator 22 performs the indication of information for identifying the assigned car (for example, the elevator number "A"). The control device 3 which has received assigned car information carries out the control for causing the relevant elevator to respond to a hall call and a destination call.

Incidentally, in this group control system, even when the ID authentication device 20 recognizes a passer as a passage-permitted person, the group control device 14 may sometimes not be able to identify the destination floor of the passage-permitted person. For example, for an IC card for a guest, the destination floor corresponding to the card information is invalid or unregistered. Furthermore, for an IC card for a building manager, the floor on which the security gate 19 is installed may sometimes be registered as the destination floor. In this case, because the boarding floor and the alighting floor become the same, the group control device 14 cannot identify the destination floor of the passage-permitted person.

Referring to also FIG. 12, the functions peculiar to this group control system (in particular, the group control device 14) will be described below. In this embodiment, the group control device 14 (or the control device 3) has the function of performing a standby operation for causing the elevator (the elevator car 2) to be on standby at a prescribed parking floor under prescribed conditions. The standby operation function may be provided in all elevators in that the group control device 14 performs group control or may be provided only in part of the elevators.

Figure 12:
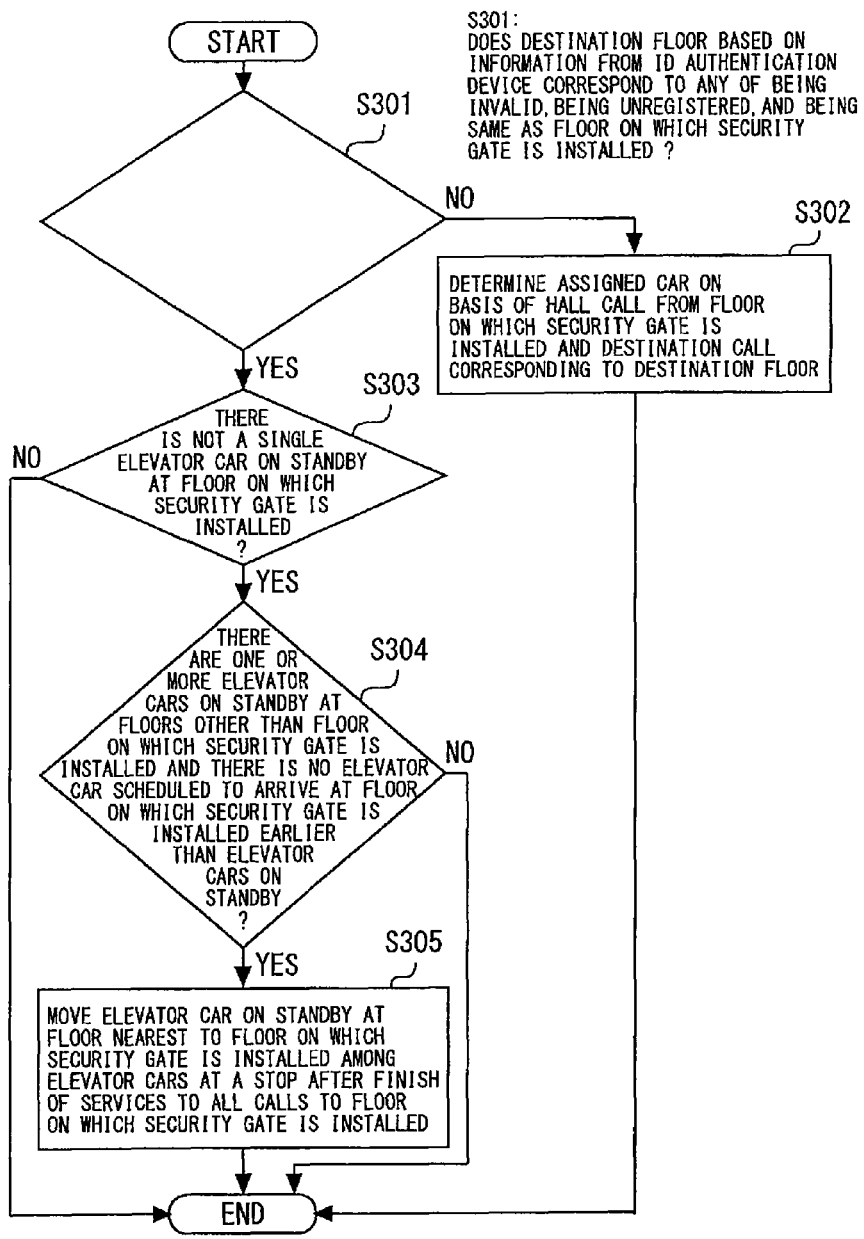
FIG. 12 is a flowchart showing the actions of the elevator group control system in the fourth embodiment according to the present invention.

FIG. 12 is a flowchart showing the actions of the elevator group control system in the fourth embodiment according to the present invention.

In the group control device 14, upon receipt of prescribed information from the ID authentication device 20, the determination means 17 makes a determination as to whether or not it is possible to identify a destination floor of a passage-permitted person. Specifically, the determination means 17 makes a determination as to whether or not the destination floor of the passage-permitted person (i.e., the passer authenticated by the ID authentication device 20 to be a pre-registered person) corresponds to any of being invalid, being unregistered, and being the same as the floor on which the security gate 19 is installed (S301). In the case where a pre-registered person who wants to move to another floor holds his or her own ID card to the card reader 21, a remote hall call registration request and a destination call registration request are sent from the ID authentication device 20 and in S301 a determination is made to the effect that the destination floor does not correspond to any of the above three. In this case, in the group control device 14, the assigned car determining means 16 determines an optimum assigned car on the basis of the information received from the ID authentication device 20 (S302).

On the other hand, in the case where a passer through the security gate 19 has an ID card for a guest, in S302 a determination is made to the effect that the destination floor corresponds to any of the above three. In this case, in the group control device 14, the registration of a hall call and a destination call is not performed. Furthermore, when in S302 a determination is made to the effect that the destination floor corresponds to any of the above three, the group control device 14 causes the assigned elevator indicator 22 to indicate an message to further the input of the destination floor in the elevator hall 1.

Moreover, when in S302 a determination is made to the effect that the destination floor corresponds to any of the above three, with the aid of the in-advance standby elevator moving means 18, the group control device 14 makes a determination as to whether or not there is an elevator car on standby at the floor on which the security gate 19 is installed (S303). Here, if there are one or more elevator cars on standby at the floor on which the security gate 19 is installed (No in S303), the group control device 14 finishes the processing.

In the case where there is not a single elevator on standby at the floor on which the security gate 19 is installed (Yes in S303), the in-advance standby elevator moving means 18 makes a determination as to whether or not there are one or more elevator cars on standby at floors other than the floor on which the security gate 19 is installed and there is no elevator car scheduled to arrive at the floor on which the security gate 19 is installed earlier than the elevator cars on standby (S304). In the case where in S304 a determination of No is made, the group control device 14 finishes the processing.

In the case where there is an elevator car on standby at a floor other than the floor on which the security gate 19 is installed and there is no elevator car scheduled to arrive at the floor on which the security gate 19 is installed earlier than the elevator car on standby, the in-advance standby elevator moving means 18 moves the elevator car on standby to the floor on which the security gate 19 is installed. In the case where there are a plurality of elevator cars on standby at floors other than the floor on which the security gate 19 is installed, the in-advance standby elevator moving means 18 moves an elevator car on standby at a floor nearest to the floor on which the security gate 19 is installed among these elevator cars to the floor on which the security gate 19 is installed (S305).

With the group control system of the above-described configuration, it is possible to move an elevator car for standby purposes to the floor on which the security gate 19 is installed not only when a passenger who has registered a destination floor in advance uses an elevator, but also when a guest or building manager whose destination floor is not registered uses an elevator.

On the other hand, because the number of times at which an elevator car is caused to be on standby at the floor on which the security gate 19 is installed decreases, the number of runs and running distance of an elevator car decrease and the energy consumption can be reduced. With the group control system of the above-described configuration, there is no possibility of a decrease in services to visitors or a building manager.

Although in this embodiment, the description was given of the configuration of the group control system, it is also possible to apply the functions peculiar to this embodiment also to an elevator system which controls one elevator. In this case, for example, the assigned elevator indicator 22 and the group control device 14 are removed from the system configuration shown in FIG. 10 and each function of the determination means 17 and the in-advance standby elevator moving means 18 is added to the control device 3. In carrying out the actions of flow shown in FIG. 12, in S303 to S305 the control device 3 makes a determination as to whether or not the elevator car is on standby at a floor other than the floor on which the security gate 19 is installed, and when the elevator car is on standby at the floor other than the floor on which the security gate 19 is installed, the control device 3 moves the elevator car to the floor on which the security gate 19 is installed.

INDUSTRIAL APPLICABILITY

The elevator system and elevator group control system of the present invention can be applied to systems which perform standby operations for causing an elevator car to be on standby at a prescribed parking floor under prescribed conditions.

REFERENCE SIGNS LIST 1 elevator hall
2, 2a-2d car
3, 3a-3d control device
4 hall button
5 remote hall call registering device
6 door
7 parking floor determination means
8 storage means
9 moving time comparison means
10, 12 standby operation go/no go determination means
11 standby operation means
13 parking floor selection means
14 group control device
15 hall destination call registering device
15a indication device
16 assigned car determining means
17 determination means
18 in-advance standby elevator moving means
19 security gate
20 ID authentication device
21 card reader
22 assigned elevator indicator

The invention claimed is:

1. An elevator system which controls an elevator by responding to hall calls of each floor and car calls and performs a standby operation for causing an elevator car to be on standby at a prescribed parking floor under prescribed conditions, comprising:

a remote hall call registering device by use of which an elevator passenger performs a hall call registration in a position at a prescribed distance from a hall;

a comparison device which, in the case where a floor on which the remote hall call registering device is installed is set as a parking floor, compares the moving time which the elevator car requires for moving from a service floor at which the elevator car has been stopped at the time of the finish of responses to all calls to the floor on which the remote hall call registering device is installed, with the walking time which a passenger requires for moving from the installation position of the remote hall call registering device to the boarding position of the elevator;

a standby operation go/no go determination device which determines whether to perform a standby operation on the basis of the result of the comparison of the comparison device; and a standby operation device which, only in the case where a determination was made by the standby operation go/no go determination device to the effect that a standby operation should be performed, causes the elevator car to move from the service floor to the parking floor after responses to all calls have been finished.

2. The elevator system according to claim 1, wherein the remote hall call registering device performs a personal authentication by checking input information against pre-registered information, and causes a hall call of the floor on which the remote hall call registering device is installed to be automatically registered when the authentication is successful.

3. The elevator system according to claim 1, further comprising:
a parking floor selection device which makes a determination, when the standby operation go/no go determination device makes a determination to the effect that a standby operation should be performed, as to whether or not there is a prescribed candidate for a parking floor between a service floor at which an elevator car has been stopped at the time of the finish of responses to all calls and the floor on which the remote hall call registering device is installed, causes the standby operation device to perform a standby operation by selecting a floor as a parking floor in the case where the candidate for a parking floor exists, and causes the standby operation device to perform a standby operation by selecting the floor on which the remote hall call registering device is installed as a parking floor in the case where the candidate for a parking floor does not exist.

4. The elevator system according to claim 3, wherein a candidate for a parking floor is a floor which is set in advance.

5. The elevator system according to claim 3, wherein in the case where there are a plurality of candidates for a parking floor between a service floor at which an elevator car has been stopped at the time of the finish of responses to all calls and the floor on which the remote hall call registering device is installed, the parking floor selection device selects a floor nearest to the service floor among the plurality of candidates for a parking floor as a parking floor.

6. An elevator group control system which performs group control of a plurality of elevators and performs a standby operation for causing an elevator car to be on standby at a prescribed parking floor under prescribed conditions, comprising:
a remote hall call registering device by use of which an elevator passenger performs a hall call registration in a position at a prescribed distance from a hall;
a comparison device which, in the case where a floor on which the remote hall call registering device is installed is set as a parking floor for at least one elevator, compares the moving time which an elevator car requires for moving from a service floor at which the elevator car has been stopped at the time of the finish of responses to all calls to the floor on which the remote hall call registering device is installed, with the walking time which a passenger requires for moving from the installation position of the remote hall call registering device to the boarding position of the elevator;
a standby operation go/no go determination device which determines whether to perform a standby operation on the basis of the result of the comparison of the comparison device; and
a standby operation device which, only in the case where a determination was made by the standby operation go/no go determination device to the effect that a standby operation should be performed and the number of elevator cars on standby at the floor on which the remote hall call registering device is installed is smaller than a prescribed number, causes an elevator car to move from the service floor to the parking floor after responses to all calls have been finished.

7. The elevator group control system according to claim 6, wherein the remote hall call registering device performs a personal authentication by checking input information against pre-registered information, and causes a hall call of the floor on which the remote hall call registering device is installed to be automatically registered when the authentication is successful.

8. The elevator group control system according to claim 6, further comprising:
a parking floor selection device which makes a determination, when the standby operation go/no go determination device makes a determination to the effect that a standby operation should be performed, as to whether or not there is a prescribed candidate for a parking floor between a service floor at which an elevator car has been stopped at the time of the finish of responses to all calls and the floor on which the remote hall call registering device is installed, causes the standby operation device to perform a standby operation by selecting a floor as a parking floor in the case where the candidate for a parking floor exists, and causes the standby operation device to perform a standby operation by selecting the floor on which the remote hall call registering device is installed as a parking floor in the case where the candidate for a parking floor does not exist.

* * * * *